(12) United States Patent
Hammer et al.

(10) Patent No.: US 8,937,953 B2
(45) Date of Patent: Jan. 20, 2015

(54) SYSTEM AND METHOD FOR ROUTING USING PATH IDENTIFIERS

(75) Inventors: Michael P. Hammer, Reston, VA (US);
Ashish Dalela, Bangalore (IN);
Monique J. Morrow, Zurich (CH);
Peter C. Tomsu, Leitzersdorf (AT)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 13/597,049

(22) Filed: Aug. 28, 2012

(65) Prior Publication Data

US 2014/0064275 A1    Mar. 6, 2014

(51) Int. Cl.
*H04L 12/28*    (2006.01)

(52) U.S. Cl.
USPC ............................................. 370/392

(58) Field of Classification Search
None
See application file for complete search history.

(56) References Cited

U.S. PATENT DOCUMENTS

| | | | | |
|---|---|---|---|---|
| 7,266,121 | B2 * | 9/2007 | Raisanen | 370/392 |
| 7,792,097 | B1 * | 9/2010 | Wood et al. | 370/352 |
| 8,457,117 | B1 * | 6/2013 | Wood et al. | 370/353 |
| 2004/0125797 | A1 * | 7/2004 | Raisanen | 370/389 |
| 2010/0046515 | A1 * | 2/2010 | Wong | 370/390 |
| 2010/0118732 | A1 * | 5/2010 | Filsfils et al. | 370/252 |
| 2010/0226304 | A1 * | 9/2010 | Shoji | 370/315 |
| 2012/0163381 | A1 * | 6/2012 | Lam | 370/392 |
| 2012/0320920 | A1 * | 12/2012 | Akiyoshi | 370/392 |
| 2013/0077630 | A1 * | 3/2013 | Bejerano et al. | 370/392 |

OTHER PUBLICATIONS

Rosenberg, J., et al., "*SIP Session Initiation Protocol*", Network Working Group, Request for Comments: 3261, Category: Standards Track, http://www.ietf.org/rfc/rfc3261.txt, Jun. 2002.
DMTF® Distributed Management Task Force, Inc., CIM Overview Document, "*The Value of the Common Information Model (Why CIM?)*", http://www.dmtf.org/sites/default/files/Why%20CIM%20Overview%20Document_2010.pdf, Jun. 2003.
IEEE Standard for Local and metropolitan area networks—, "*Virtual Bridged Local Area Networks*", Std 802.1Q-2005, 2006.
DMTF® Distributed Management Task Force, Inc., CMDB Federation, "*DMTF Standards for Federating CMDBs and other Management Data Repositories*", http://www.dmtf.org/sites/default/filesDMTF_Standards_for_Federating_CMDBs_20090910v2.pdf, Sep. 10, 2009.

(Continued)

*Primary Examiner* — Hassan Phillips
*Assistant Examiner* — Hicham Foud
(74) *Attorney, Agent, or Firm* — Baker Botts L.L.P.

(57) ABSTRACT

In one embodiment, a method includes receiving a first packet sent by a first node. The packet includes a first Layer 3 source address, a first Layer 3 destination address, a first Layer 2 source hardware identifier, a first Layer 2 destination hardware identifier, and a first path identifier. The first path identifier is situated between a Layer 2 header of the first packet and a Layer 3 header of the first packet. The method includes automatically determining a first port of the first network element associated with a second node. The second node is associated with the first Layer 2 destination hardware identifier. A second path identifier is automatically determined based on the first port. The first packet is prevented from being delivered to the second node in response to determining that the first path identifier and the second path identifier are different.

20 Claims, 3 Drawing Sheets

(56) References Cited

OTHER PUBLICATIONS

DMTF® Distributed Management Task Force, Inc., "*Open Virtualization Format Specification*", Document No. DSP0243, Version 1.1.0, http://www.dmtf.org/sites/default/files/standards-documents/DSP0243_1.1.0.pdf, Jan. 12, 2010.

Cisco Overlay Transport Virtualization Technology Introduction and Deployment Considerations, "*Chapter 1: OTV Technology Introduction and Deployment Considerations*" http://www.cisco.com/en/US/docs/solutions/Enterprise/Data_Center/DCI/whitepaper/DCI_1.html, Jan. 17, 2012.

Cisco Nexus 7000 Series NX-OS LISP Configuration Guide, OL-25808-03, "*LISP VM-Mobility*", http://www.cisco.com/en/US/docs/switches/datacenters/sw/nx-os/lisp/configuraton/guide/b_NX-OS_LISP_Configuration_Guide_chapter_010.html, Aug. 10, 2012.

DMTF® Distributed Management Task Force, Inc., "Open Virtualization Format Specification" Document No. DSP0243, Version: 2.0.0, http://www.dmtf.org/sites/default/files/standards-documents/DSP0243_2.0.0.pdf, Dec. 13, 2012.

Awduche, Daniel O., et al., "RSVP-TE: Extensions to RSVP for LSP Tunnels", Network Working Group, Internet Draft, http://tools.ietf.org/html/draft-ietf-mpls-rsvp-lsp-tunnel-08, 61 pages, Feb. 2001.

HomChaudhuri, S., et al., "Cisco Systems' Private VLANs: Scalable Security in a Multi-Client Environment", Request for Comments: 5517, Category: Informational, ISSN: 2070-1721, http://tools.ietf.org/html/rfc5517, 12 pages, Feb. 2010.

\* cited by examiner

| TIME | VM | IP | MAC | HOST | PATH |
|---|---|---|---|---|---|
| t1 | VM1 | 1.1.1.1 | 20-20-1-1-0-0 | 180 | 1 |
| | VM2 | 1.1.1.2 | 20-20-1-2-0-0 | 181 | 2 |
| t2 | VM1 | 1.1.1.1 | 20-20-1-1-0-0 | 180 | 1 |
| | VM2 | 1.1.1.2 | 20-20-2-2-0-0 | 183 | 2 |
| t3 | VM1 | 1.1.1.1 | 20-20-3-1-0-0 | 182 | 1 |
| | VM2 | 1.1.1.2 | 20-20-2-2-0-0 | 183 | 2 |
| t4 | VM1 | 1.1.1.1 | 20-20-3-1-0-0 | 182 | 1 |
| | VM2 | 1.1.1.2 | 20-20-4-1-0-0 | 185 | 2 |

| ROUTER | | |
|---|---|---|
| DEST IP | INTERFACE | PATH |
| 1.1.1.1 | ETH 1/1 | 1 |
| 1.1.1.2 | ETH 1/2 | 2 |

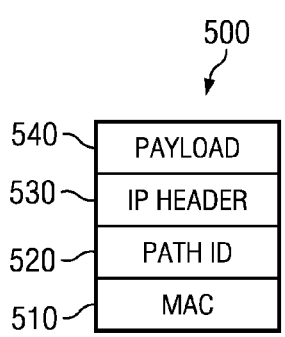
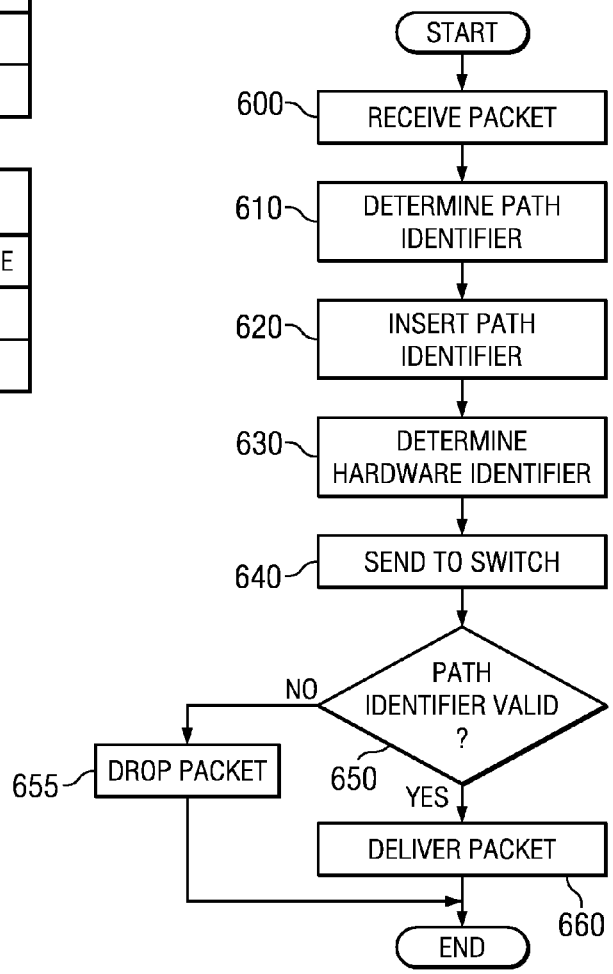
*FIG. 4*
*FIG. 5*
*FIG. 6*

SYSTEM AND METHOD FOR ROUTING USING PATH IDENTIFIERS

TECHNICAL FIELD

This disclosure relates generally to computer networks and more particularly to a system and method for routing using path identifiers.

BACKGROUND

In order to provide efficient use of resources and improved reliability, networks are often configured with logical or virtual servers rather than a single entity server. For example, enterprise networks often use a logical server to represent multiple physical devices. Also, many network managers are turning to virtualization so that resources can be shared across a network. Through the use of virtualization, multiple operating systems and applications can run on the same computer at the same time, thereby increasing utilization and flexibility of hardware. Virtualization allows servers to be decoupled from underlying hardware, thus resulting in multiple virtual servers sharing the same physical server hardware. This also allows the virtual server to be moved from one physical server to another physical server. Using such technology in a data center where multiple service providers are hosted can lead to problems that have not been adequately addressed. Examples include security issues and resource usage issues.

SUMMARY

In one embodiment, a method executed by at least one processor includes receiving, at a first network element, a first packet sent by a first node. The packet includes a first Layer 3 source address, a first Layer 3 destination address, a first Layer 2 source hardware identifier, a first Layer 2 destination hardware identifier, and a first path identifier. The first path identifier is situated between a Layer 2 header of the first packet and a Layer 3 header of the first packet. The method also includes automatically determining, in response to receiving the first packet, a first port of the first network element associated with a second node. The second node is associated with the first Layer 2 destination hardware identifier. The method includes automatically determining a second path identifier based on the first port and automatically preventing the first packet from being delivered to the second node associated with the first Layer 2 destination hardware identifier in response to determining that the first path identifier and the second path identifier are different.

In some embodiments, the first network element may include a switch. The method may include determining, at a second network element, the first path identifier based on an ingress port of the second network element configured to receive the first packet. The method may also include inserting, by the second network element, the first path identifier into the first packet. Inserting the first path identifier into the first packet may include adding a header comprising the first path identifier to the first packet.

In one embodiment, a system includes a first network element configured to receive a first packet sent by a first node. The packet includes a first Layer 3 source address, a first Layer 3 destination address, a first Layer 2 source hardware identifier, a first Layer 2 destination hardware identifier, and a first path identifier. The first path identifier is situated between a Layer 2 header of the first packet and a Layer 3 header of the first packet. The first network element comprises a processor that is configured to automatically determine a first port of the first network element associated with a second node in response to receiving the first packet. The second node is associated with the first Layer 2 destination hardware identifier. The processor is also configured to automatically determine a second path identifier based on the first port. The processor is further configured to automatically prevent the first packet from being delivered to the second node associated with the first Layer 2 destination hardware identifier in response to determining that the first path identifier and the second path identifier are different.

Depending on the specific features implemented, particular embodiments may exhibit some, none, or all of the following technical advantages. Traffic may be isolated amongst multiple service providers within a data center. Services may be moved across hosts in a data center with reduced forwarding latencies. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which:

FIG. 4 illustrates tables that include examples of information that may be included in switches of FIG. 1;

FIG. 5 is a block diagram illustrating one embodiment of incorporating a path identifier in a packet routed in the system of FIG. 1;

FIG. 6 illustrates an example method for routing a packet using a path identifier in the system of FIG. 1.

DESCRIPTION OF EXAMPLE EMBODIMENTS

Figures 1, 2, 3:
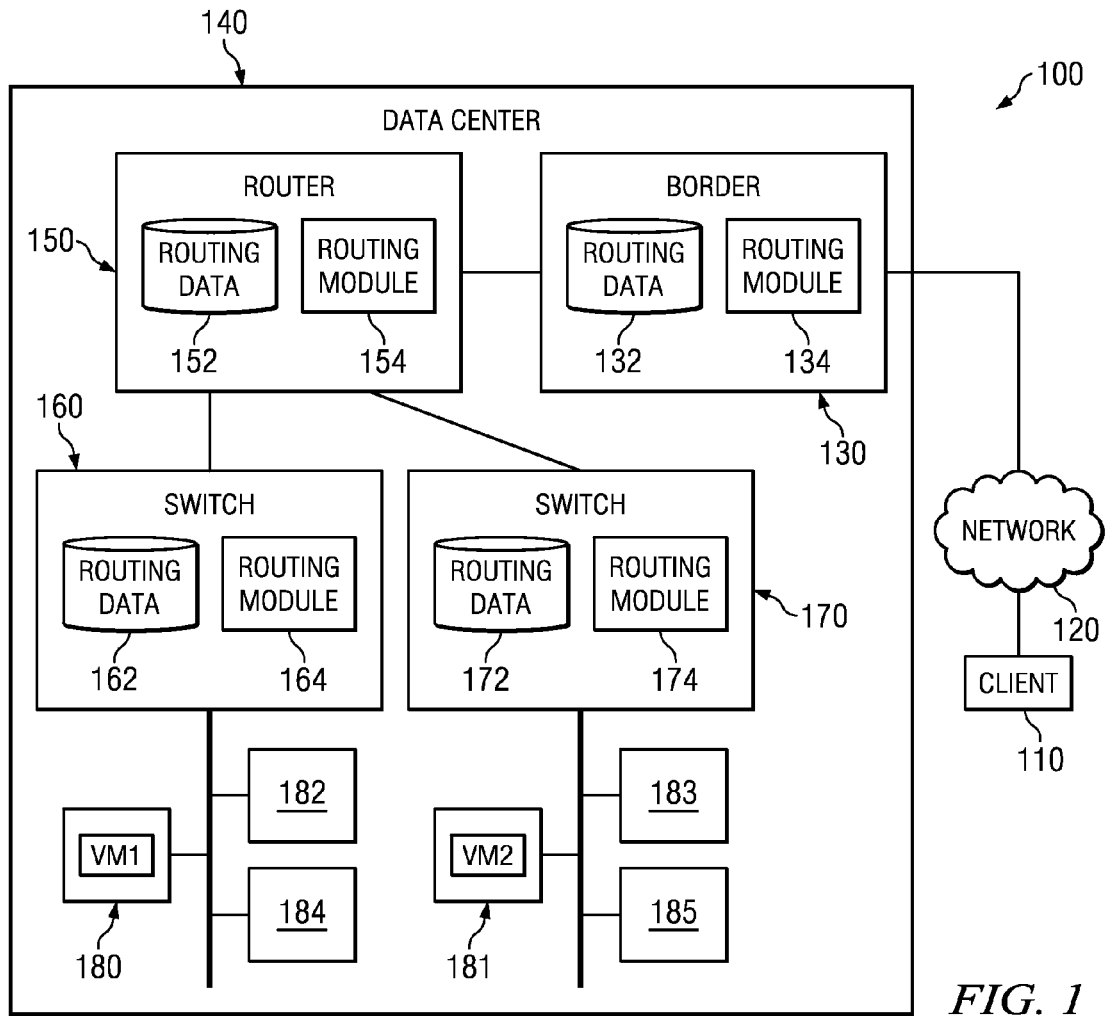
FIG. 1 illustrates one embodiment of a system that implements a framework for routing using path identifiers.
FIG. 2 is a table illustrating an example of virtual machines being hosted on different hosts within a data center at different periods of time.
FIG. 3 illustrates information that may be stored in a router of FIG. 1.

FIG. 1 illustrates one embodiment of system 100 that implements a framework for routing using path identifiers. System 100 includes client 110 coupled to network 120. Network 120 is also coupled to data center 140. In data center 140, network elements such as router 150 and switches 160 and 170 are used to network hosts 180-185. One or more of hosts 180-185 may be used to provide services to client 110 over network 120. In some embodiments, virtual machines may be used to provide such services. For example, host 180 may include virtual machine VM1 and host 181 may include virtual machine VM2. Virtual machines VM1 and VM2 may be used to provide services to client 110. Communication from client 110 may be routed to one or more of hosts 180-185 using a path identifier that is used within data center 140. Border element 130 (another network element) may be used to apply path identifiers to communication from network 120 entering data center 140.

In certain embodiments, multiple service providers may utilize the resources of data center 140 to provide services to clients. In such embodiments, the path identifiers may reduce or eliminate routing, security, or other challenges that arise in such an environment. In particular embodiments, the path identifiers prevent communications from being routed to particular interfaces or ports. For example, a network entity of data center 140 may determine whether to forward a packet along a particular network path based on the path identifier of the packet and may drop the packet if the path identifier is invalid. In such embodiments, path identifiers may prevent one service or vendor from sending packets to another service or vendor in data center 140. This may prevent one service or vendor from being able to observe Internet Protocol (IP) addresses associated with another service or vendor in data center 140. As another example, the use of path identifiers may allow for a logical division of a network in data center 140 to occur. This enables hardware to be divided into groups. This may allow for dynamic reassignment of hardware resources and associated efficiencies (e.g., being able to power off hardware when it is not in use).

In particular embodiments, a path identifier is situated between a layer 2 header and a layer 3 header of a packet. Such embodiments may allow for a greater number of unique path identifiers (and thus may accommodate a greater number of services or service providers) than a path identifier placed in a constrained space such as a layer 2 header. In various embodiments, the path identifier is added to a packet by a network element of data center 140 and the packet is delivered (or prevented from being delivered) without swapping or changing the path identifier during routing of the packet. In particular embodiments, the path identifier is used (in combination with other information) to determine the route a packet should take. In other embodiments, the path identifier is decoupled from the routing procedure. That is, in such embodiments, the path identifier is not taken into account to determine the path that a packet should take when the packet is routed to the destination of the packet. Rather, the path of the packet is decided using different means, and the path identifier is utilized to determine whether the packet may be forwarded along that path. Thus, the routing logic of a network element may include a logical block (e.g., an application-specific integrated circuit (ASIC)) that determines all or a portion of the routing path and a separate logical block (e.g., a different ASIC) that performs functions related to the path identifier and other port-related functions.

In some embodiments, client 110 may refer to any device that enables a user to interact with one or more services provided in data center 140 using network 120. In some embodiments, client 110 may include a computer, workstation, telephone, Internet browser, electronic notebook, Personal Digital Assistant (PDA), computer tablet, or any other suitable device (wireless, wireline, or otherwise), component, or element capable of receiving, processing, storing, or communicating information with other components of system 100. In some embodiments, for example, client 110 may be a smartphone, a desktop computer, a laptop computer, or an IP-enabled telephone. Client 110 may also comprise any suitable user interface such as a display. System 100 may include any suitable number of clients such as client 110 that may be operated by any suitable number of users.

Network 120, in some embodiments, may be implemented using one or more networks, such as an ad hoc network, a personal area network (PAN), a local area network (LAN), a wide area network (WAN), a metropolitan area network (MAN), or one or more portions of the Internet. One or more portions of one or more of these networks may be wired or wireless. As examples, network 120 may be implemented using one or more of a wireless PAN (WPAN) (e.g., a BLUETOOTH WPAN), a WI-FI network, a WI-MAX network, a Long Term Evolution (LTE) network, a cellular telephone network (e.g., a Global System for Mobile Communications (GSM) network), or other suitable wireless network.

In some embodiments, border element 130, router 150, switches 160, and/or hosts 180-185 may each be implemented using one or more computing systems. Software running on one or more of such computing systems may perform one or more steps of one or more methods described or illustrated herein or provides functionality described or illustrated herein. Such computing systems may be in any suitable physical form. As examples and not by way of limitation, a computing system may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, a router, a switch, or a combination of two or more of these. Where appropriate, computing systems may: be unitary or distributed; span multiple locations; span multiple machines; or reside in a computing cloud (e.g., a networked-set of computing systems), which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Routing data 132, 152, 162, and 172 may each be implemented using any suitable structure for storing and retrieving information in some embodiments. Databases, file systems, tables, lists, or suitable combinations of these structures are examples of how any of routing data 132, 152, 162, and 172 may be implemented. Computer-readable non-transitory storage media may be used to implement any of routing data 132, 152, 162, and 172, such as: a semiconductor-based or other integrated circuit (IC) (e.g., a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

In some embodiments, routing modules 134, 154, 164, and 174 may be implemented using software, hardware, firmware, or any suitable combination of the three. Routing modules 134, 154, 164, and 174 may each include instructions intended to be executed by a processing device to accomplish the functions described herein with respect to border element 130, router 150, switch 160, and switch 170, respectively.

Border element 130 may be used to process communication entering or exiting data center 140 in some embodiments. Border element 130 may perform security functions, such as packet inspection, firewall-related activities, and intrusion detection activities. Border element 130 may also perform activities related to path identifiers, such as inserting path identifiers into packets entering data center 140 and removing path identifiers from packets leaving data center 140. The actions discussed herein performed by border element 130 may be performed using routing module 134 and information contained in routing data 132. For example, routing data 132 may include information that associates IP addresses with path identifiers and routing module 134 may use such information to insert and/or remove path identifiers from packets. As another example, routing data 132 may associate path identifiers with ports (e.g., ingress ports) of border element 130, and routing module 134 may use such information to insert and/or remove path identifiers from packets.

In some embodiments, virtual machines VM1 and VM2 may each be a software implementation of a computing device (e.g., a computer) that executes programs like a physical computing device. As examples, virtual machines VM1 and VM2 may each be a platform that supports the execution of a complete operating system and/or a process virtual machine that is designed to run one or more programs. Virtualization solutions from VMWARE, PARALLELS, and XEN are examples of manners in which virtual machines VM1 and VM2 may be implemented. Virtual machines VM1 and VM2 may each be configured to provide one or more services and may each be capable of executing on one or more of hosts 180-185.

Data center 140 may represent a collection of hardware devices that serve to host multiple applications used by client 110 using network 120 in some embodiments. Data center 140 may include one or more networks that allow for communication sessions to occur with hosts 180-185. Multiple service providers may use aspects of the infrastructure of data center 140 to provide services. For example, a service provider may have an agreement with an entity associated with data center 140 wherein the service provider may utilize one or more of hosts 180-185 to provide one or more services. This may be true of other service providers. As a result, in some embodiments, multiple service providers may utilize the same hardware resources (e.g., one or more of hosts 180-185) of data center 140 or may reside on the same network or sub-network within data center 180. Virtualization techniques may be used to provide multiple service providers access to physical hardware resources of data center 140. For example, services by service providers may be implemented using virtual machines (e.g., virtual machines VM1 and VM2) hosted on hardware such as hosts 180-185.

In some embodiments, management of hardware resources in data center 140 may lead to virtual machines being run on different hardware devices depending on the environment and traffic patterns within data center 140. As a result, a virtual machine providing a service may be hosted on different ones of hosts 180-185 over time. Such characteristics of providing services using data center 140 may lead to challenges that may be ameliorated using path identifiers. For example, the movement of a virtual machine from one hardware device to another (e.g., virtual machine VM1 may be hosted on host 180 at one point in time and host 182 at another point in time) may cause routing challenges and security challenges. As another example, isolating traffic amongst multiple service providers within data center 140 may be difficult because services of multiple service providers may be offered from hosts that reside on the same network segment (e.g., one service provider may have its service hosted on host 180 while a different service provider may have a service hosted on host 182). As another example, having the ability to move services across hosts in data center 140 may lead to forwarding latencies and scaling issues (e.g., scaling to millions of virtual hosts). Fairly sharing the distribution of resources in data center 140 amongst multiple service providers can also be a challenge that is partially or fully addressed using path identifiers. Another benefit of using path identifiers is the ability to provide policy-based forwarding of Ethernet flows.

FIG. 2 is a table illustrating an example of virtual machines VM1 and VM2 being hosted on different hosts within data center 140 at different periods of time. At time T1, virtual machine VM1 is hosted on host 180 and virtual machine VM2 is hosted on host 181. Virtual machine VM1 may be associated with a network address such as Internet Protocol (IP) address 1.1.1.1. On host 180 at time T1, virtual machine VM1 may be associated with a hardware address such as Media Access Control (MAC) address 20-20-1-1-0-0 and virtual machine VM2 at time T1 may be associated with MAC address 20-20-1-2-0-0 while at host 181. At time T2, virtual machine VM2 is hosted on a different host, host 183. However, virtual machine VM2 will keep its IP address even though it is at a different host; hence, the IP address of virtual machine VM2 is 1.1.1.2. Virtual machine VM2 will also be associated with the same path identifier (path identifier 2) even though it has changed hosts. The MAC address associated with virtual machine VM2 may be different because virtual machine VM2 is at a different host than at time T1; in various embodiments, the MAC address may not change. The MAC address of virtual machine VM2 at time T2 is 20-20-2-2-0-0. At time T3, virtual machine VM1 is at a different host than it was at times T1 and T2. As a result, the MAC address associated with virtual machine VM1 may be different: 20-20-3-1-0-0; in various embodiments, the MAC address may not change. However, both the IP address and the path identifier associated with virtual machine VM1 is the same as in time periods T1 and T2. At time T4, virtual machine VM2 is at a different host (host 185) than at time T3. Virtual machine VM2 may have a different MAC address than in previous time periods: 20-20-4-1-0-0. At time T4, though, virtual machine VM2 has the same path identifier and the same IP address as before.

In some embodiments, when a virtual machine moves from one host to another, aspects of system 100 may be updated to reflect the move. As examples, any of routing data 132, 152, 162, and 172 may be updated. MAC address flooding may be used to update routing data 132, 152, 162, and 172 when a virtual machine has moved to another host. For example, if virtual machine VM1 moves from host 180 to host 182, one or more of border element 130, router 150, and switches 160 and 170 may transmit information indicating virtual machine VM1 is now associated with MAC address 20-20-3-1-0-0. While aspects of the Address Resolution Protocol (ARP) may be used to implement the communication discussed in this paragraph, any suitable protocol or technique may be used.

FIG. 3 illustrates information that, in some embodiments, may be stored in router 150. The destination IP addresses of packets coming into data center 140 may be associated with an interface and a path identifier by router 150. For example, router 150 may associate IP address 1.1.1.1 with path identifier 1 and IP address 1.1.1.2 with path identifier 2. If router 150 receives a packet that has a destination IP address of 1.1.1.1, router 150 will ensure that the packet also includes path identifier 1 before continuing to route the packet to the appropriate switch over the interface associated with IP address 1.1.1.1 (e.g., interface ETH 1/1). Similarly, router 150 may ensure that a packet destined for IP address 1.1.1.2 includes path identifier 2 before routing the packet out through interface ETH 1/2. For example, if a packet received by router 150 has a destination IP address of 1.1.1.1, but does not include a path identifier or the path identifier in the packet is not path identifier 1, then router 150 may not continue to route the packet (e.g., router 150 may drop the packet). The actions performed by router 150 described above may be performed using routing module 152.

FIG. 4 illustrates tables 410 and 420 that include examples of information that may be included in switches 160 and 170, respectively. In some embodiments, switch 160 may include information that associates IP addresses set as the destination address of incoming packets with hardware identifiers (e.g., MAC addresses) and interface ports (e.g., Ethernet ports). Switch 160 associates IP address 1.1.1.1 with MAC address 20-20-1-1-0-0 and will route incoming packets for IP address 1.1.1.1 onto port ETH 5/1. Switch 170 associates IP address 1.1.1.2 with MAC address 20-20-1-2-0-0 and will route incoming packets for IP address 1.1.1.2 onto port ETH 6/1. FIG. 4 illustrates similar types of information being associated with IP addresses 1.0.1.1 and 1.1.1.3 in tables 410 and 420. In some embodiments, tables 410 and 420 may also associate the ports of switches 160 and 170 with path identifiers. For example, port ETH 5/1 may be associated with path identifier 1 and port ETH 5/2 may be associated with path identifier 2. The information represented in table 410 may be stored as routing data 162. The information represented in table 420 may be stored as routing data 172. The actions performed by switch 160 described above may be performed using routing module 164. The actions performed by switch 170 described above may be performed using routing module 174. In some embodiments, service providers using data center 140 may be associated with different ports of switches 160 and/or 170. For example, one service provider may be associated with interface ETH 5/1 of switch 160 while a separate service provider may be associated with ETH 5/2 of switch 160. A path identifier may be associated with each service provider and each port of switches 160 and 170. In some embodiments, this may be provide for a form of network segmentation such that multiple service providers using resources in data center 140 may have their traffic segmented from each other.

FIG. 5 is a block diagram illustrating one embodiment of incorporating a path identifier in packet 500 routed in system 100 of FIG. 1. Packet 500 includes MAC information 500, IP header 530, and payload 540. Path identifier 520 may be a separate layer of packet 500 (e.g., situated between Layer 2 and Layer 3 information in packet 500).

FIG. 6 illustrates an example method for routing a packet using a path identifier in system 100 of FIG. 1. The steps of FIG. 6 discussed below may be repeated as necessary to route multiple packets. While the steps of FIG. 6 are discussed below using the components and configuration of FIG. 1 as an example, the steps of FIG. 6 may be performed in other suitable manners as discussed further below. Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

The method may start, in some embodiments, at step 600, where one or more packets may be received. For example, client 110 may have sent a packet. The packet may be destined for a node within data center 140. Client 110 may have sent the packet as part of a session with a service being provided by a service provider that uses data center 140 to host an application or service. The packet(s) may have a destination address associated with virtual machine VM1. The packet(s) may be received by a router or a border node at data center 140, such as router 150 or border element 130.

At step 610, in some embodiments, a path identifier may be determined for the packet received at step 600. This step may be performed by border element 130, router 150, or other suitable devices in data center 140. As an example, the path identifier may be determined by examining the destination address (e.g., an Open Systems Interconnection (OSI) Layer 3 address such as the destination IP address) of the packet received at step 600. The path identifier may be associated with a service provider associated with the destination IP address of the packet received at step 600. As another example, the port on which the packet was received (e.g., the ingress port) may be used to determine the path identifier. The path identifier may be associated with a service provider that is associated with one or more particular ports. Databases, tables, or other suitable information repositories may be used to determine the path identifier.

At step 620, in some embodiments, the path identifier determined at step 610 may be inserted into the packet received at step 600. This step may be performed by border element 130, router 150, or other suitable devices in data center 140. For example, a header with the path identifier may be inserted into the packet (e.g., between OSI Layer 2 and Layer 3 headers). As another example, a portion of a destination MAC address may be modified and used as the path identifier. As another example, the path identifier may be included in an Ethernet header of the packet (e.g., using bits reserved for VLAN stacking in the Ethernet header).

At step 630, in some embodiments, a hardware identifier (e.g., an OSI Layer 2 identifier) may be determined. This may be performed by router 150. The hardware identifier determined at this step may be associated with the host associated with the destination IP address of the packet received at step 600. For example, if the packet received at step 600 was associated with virtual machine VM1 and virtual machine VM1 is hosted on host 180, then the hardware identifier determined at step 630 may be the MAC address of host 180. Other suitable hardware identifiers may be used. Tables, databases, or other suitable information repositories may be used to determine the hardware identifier. For example, a routing table may be used at this depth that associates IP addresses with corresponding MAC addresses.

At step 640, in some embodiments, the packet received at step 600 may be sent to a switch. The switch may be coupled to the host associated with the hardware identifier determined at step 630. For example, router 150 may send the packet received at step 600 to switch 160 because the hardware identifier determined at step 630 was associated with host 180.

At step 650, in some embodiments, the path identifier is analyzed to determine whether it is valid. This may be performed by switches 160 or 170 or router 150. This may be performed by the switch receiving the packet sent at step 640. For example, the path identifier may not be determined to be valid if the host or port associated with the destination address of the packet received at step 600 has a different path identifier than the path identifier inserted at step 620. As another example, the entity sending the packet received at step 600 may be associated with a different path identifier than the path identifier associated with the host or port coupled to the switch that may receive the packet. If the path identifier is determined not to be valid, then step 655 may be performed and the packet may be dropped. If the packet is determined to be valid, then step 660 may be performed and the packet may be delivered to the host. After either step 655 or step 660 is performed, the method may end.

The examples discussed above with respect to FIG. 6 illustrate how routing may be performed in system 100. OSI Layer 2 routing may be used in system 100 instead of, or in addition to, OSI Layer 3 routing. For example, an IP address is used as a logical identifier to identify a host and the MAC address is used as a physical identifier to locate the host in data center 140 in at least some of the examples discussed above with respect to FIGS. 1-6. In some embodiments, this may result in using the destination MAC address of a packet to route the packet to its destination instead of the destination IP address. The examples discussed above with respect to FIG. 6 may also illustrate how network segmentation may be performed in system 100. Service providers of data center 140 may be associated with separate path identifiers. Ports of switches in data center 140 (e.g., switches 160 and 170) may be coupled to separate service providers and the switches may include information that associates path identifiers with the ports of the switches. For example, ports of border element 130 may be associated with various service providers.

Advantages may be realized in one or more of the examples discussed above with respect to FIGS. 1-6. For example, isolation of services and/or service providers in a data center may be achieved (e.g., OSI Layer 2 isolation). This may prevent one service or vendor from being able to send packets to another service or vendor in the data center. This may prevent one service or vendor from being able to observe IP addresses associated with another service or vendor in the data center. As another example, the use of path identifiers may allow for a logical division of a network in a data center to occur. This may allow for dividing hardware into groups. This may allow for dynamic reassignment of hardware resources and associated efficiencies (e.g., being able to power off hardware when it is not in use).

While the various examples and embodiments discussed above use the OSI model, the OSI model is only one example of a networking architecture that may employ the techniques discussed herein. The teachings of this disclosure may be used with other suitable networking stacks, protocols, or architectures, such as the TCP/IP (Transmission Control Protocol/Internet Protocol) model.

Figure 7:
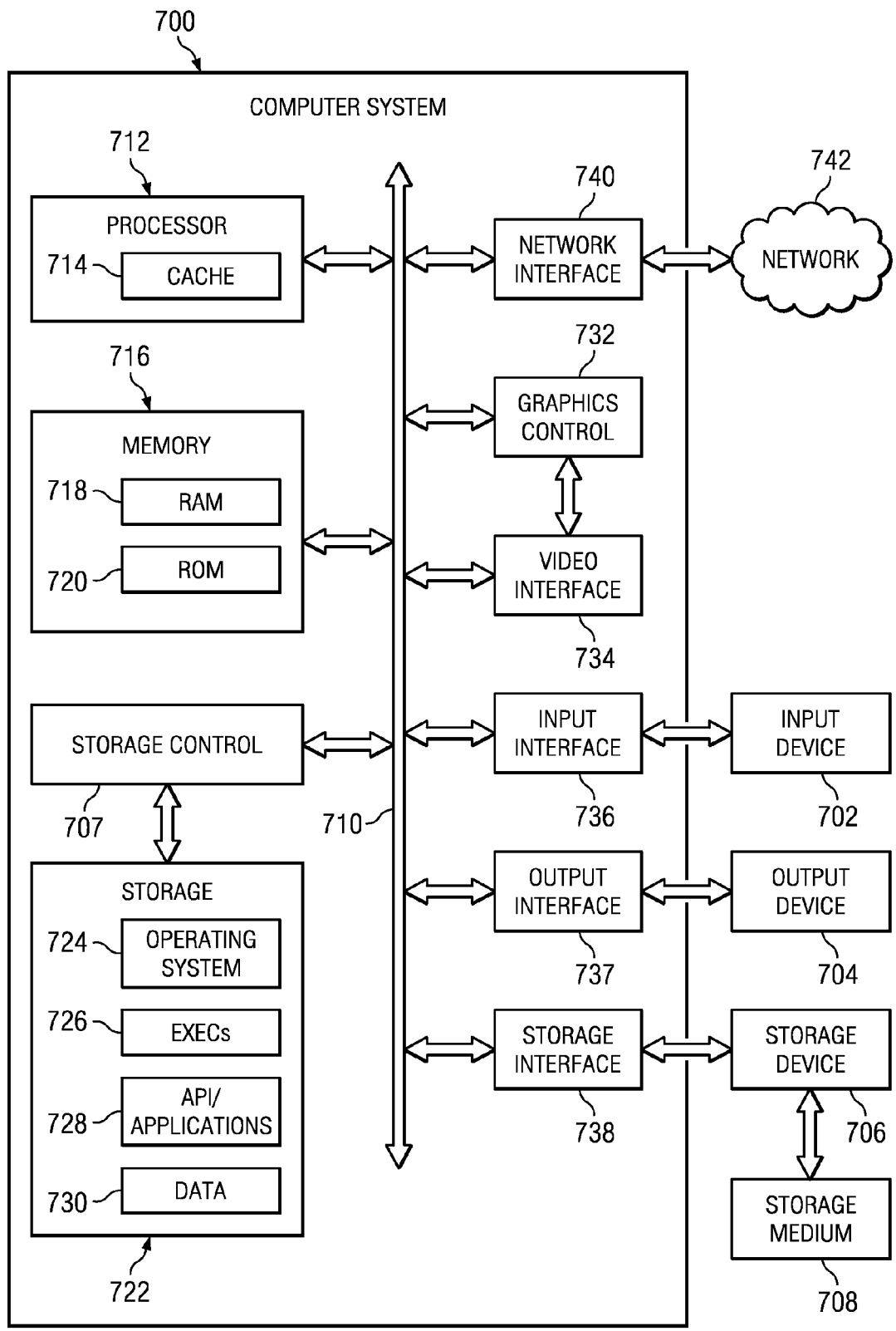
FIG. 7 illustrates an example computer system suitable for implementing one or more portions of particular embodiments.

FIG. 7 illustrates an example computer system 700 suitable for implementing one or more portions of particular embodiments. Although the present disclosure describes and illustrates a particular computer system 700 having particular components in a particular configuration, the present disclosure contemplates any suitable computer system having any suitable components in any suitable configuration. Moreover, computer system 700 may have take any suitable physical form, such as for example one or more integrated circuit (ICs), one or more printed circuit boards (PCBs), one or more handheld or other devices (such as mobile telephones or PDAs), one or more personal computers, or one or more super computers. Components discussed above with respect to FIGS. 1-6 (e.g., client 110, network 120, border element 130, router 150, switches 160 and 170, and hosts 180-185) may be implemented using all of the components, or any appropriate combination of the components, of computer system 700 described below.

Computer system 700 may have one or more input devices 702 (which may include a keypad, keyboard, mouse, stylus, etc.), one or more output devices 704 (which may include one or more displays, one or more speakers, one or more printers, etc.), one or more storage devices 706, and one or more storage medium 708. An input device 702 may be external or internal to computer system 700. An output device 704 may be external or internal to computer system 700. A storage device 706 may be external or internal to computer system 700. A storage medium 708 may be external or internal to computer system 700.

System bus 710 couples subsystems of computer system 700 to each other. Herein, reference to a bus encompasses one or more digital signal lines serving a common function. The present disclosure contemplates any suitable system bus 710 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 700 includes one or more processors 712 (or central processing units (CPUs)). A processor 712 may contain a cache 714 for temporary local storage of instructions, data, or computer addresses. Processors 712 are coupled to one or more storage devices, including memory 716. Memory 716 may include random access memory (RAM) 718 and read-only memory (ROM) 720. Data and instructions may transfer bidirectionally between processors 712 and RAM 718. Data and instructions may transfer unidirectionally to processors 712 from ROM 720. RAM 718 and ROM 720 may include any suitable computer-readable storage media. For example, aspects of this paragraph may be used to implement routing data 132, 152, 162, and 172 as well as routing modules 134, 154, 164, and 174.

Computer system 700 includes fixed storage 722 coupled bi-directionally to processors 712. Fixed storage 722 may be coupled to processors 712 via storage control unit 707. Fixed storage 722 may provide additional data storage capacity and may include any suitable computer-readable storage media. Fixed storage 722 may store an operating system (OS) 724, one or more executables (EXECs) 726, one or more applications or programs 728, data 730 and the like. Fixed storage 722 is typically a secondary storage medium (such as a hard disk) that is slower than primary storage. In appropriate cases, the information stored by fixed storage 722 may be incorporated as virtual memory into memory 716. For example, aspects of this paragraph may be used to implement routing data 132, 152, 162, and 172.

Processors 712 may be coupled to a variety of interfaces, such as, for example, graphics control 732, video interface 734, input interface 736, output interface 737, and storage interface 738, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 740 may couple processors 712 to another computer system or to network 742. Network interface 740 may include wired, wireless, or any combination of wired and wireless components. Such components may include wired network cards, wireless network cards, radios, antennas, cables, or any other appropriate components. With network interface 740, processors 712 may receive or send information from or to network 742 in the course of performing steps of particular embodiments. Particular embodiments may execute solely on processors 712. Particular embodiments may execute on processors 712 and on one or more remote processors operating together.

In a network environment, where computer system 700 is connected to network 742, computer system 700 may communicate with other devices connected to network 742. Computer system 700 may communicate with network 742 via network interface 740. For example, computer system 700 may receive information (such as a request or a response from another device) from network 742 in the form of one or more incoming packets at network interface 740 and memory 716 may store the incoming packets for subsequent processing. Computer system 700 may send information (such as a request or a response to another device) to network 742 in the form of one or more outgoing packets from network interface 740, which memory 716 may store prior to being sent. Processors 712 may access an incoming or outgoing packet in memory 716 to process it, according to particular needs.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 716 may include one or more computer-readable storage media embodying software and computer system 700 may provide particular functionality described or illustrated herein as a result of processors 712 executing the software. Memory 716 may store and processors 712 may execute the software. Memory 716 may read the software from the computer-readable storage media in mass storage device 716 embodying the software or from one or more other sources via network interface 740. When executing the software, processors 712 may perform one or more steps of one or more processes described or illustrated herein, which may include defining one or more data structures for storage in memory 716 and modifying one or more of the data structures as directed by one or more portions the software, according to particular needs. In addition or as an alternative, computer system 700 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Herein, reference to a computer-readable non-transitory storage medium may include a semiconductor-based or other integrated circuit (IC), such as for example a field-programmable gate array (FPGA) or an application-specific IC (ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method executed by at least one processor comprising:
   receiving, at a first network element, a first packet sent by a first node, the packet comprising a first Layer 3 source address, a first Layer 3 destination address, a first Layer 2 source hardware identifier, a first Layer 2 destination hardware identifier, and a first path identifier, the first path identifier situated between a Layer 2 header of the first packet and a Layer 3 header of the first packet;
   in response to receiving the first packet, automatically determining a first port of the first network element associated with a second node, the second node associated with the first Layer 2 destination hardware identifier;
   automatically determining a second path identifier based on the first port;
   automatically preventing the first packet from being delivered to the second node associated with the first Layer 2 destination hardware identifier in response to determining that the first path identifier and the second path identifier are different.

2. The method of claim 1, wherein the first network element comprises a switch.

3. The method of claim 1, further comprising:
   determining, at a second network element, the first path identifier based on an ingress port of the second network element configured to receive the first packet; and
   inserting, by the second network element, the first path identifier into the first packet.

4. The method of claim 3, wherein inserting the first path identifier into the first packet comprises adding a header to the first packet, the header comprising the first path identifier.

5. The method of claim 1, further comprising:
   receiving, at the first network element, a second packet after receiving the first packet, the second packet comprising a second Layer 3 source address, a second Layer 3 destination address, a second Layer 2 source hardware identifier, a second Layer 2 destination hardware identifier, and a third path identifier;

automatically determining a fourth path identifier based on a second port of the first network element associated with the second Layer 2 destination hardware identifier;

automatically causing the first packet to be delivered to a third node associated with the second Layer 2 destination hardware identifier in response to determining that the third path identifier and the fourth path identifier are the same.

6. The method of claim 1, wherein the first Layer 3 destination address is an Internet Protocol (IP) address and the second Layer 2 hardware identifier is a Media Access Control (MAC) address.

7. The method of claim 1, wherein the first path identifier is associated with a first service provider and the second path identifier is associated with a second service provider, the first service provider providing a first service using a first data center, the second service provider providing a second service using the first data center.

8. Non-transitory computer-readable media comprising instructions that, when executed by a processor, are configured to:

receive, at a first network element, a first packet sent by a first node, the packet comprising a first Layer 3 source address, a first Layer 3 destination address, a first Layer 2 source hardware identifier, a first Layer 2 destination hardware identifier, and a first path identifier, the first path identifier situated between a Layer 2 header of the first packet and a Layer 3 header of the first packet;

in response to receiving the first packet, automatically determine a first port of the first network element associated with a second node, the second node associated with the first Layer 2 destination hardware identifier;

automatically determine a second path identifier based on the first port;

automatically prevent the first packet from being delivered to the second node associated with the first Layer 2 destination hardware identifier in response to determining that the first path identifier and the second path identifier are different.

9. The media of claim 8, wherein the first network element comprises a switch.

10. The media of claim 8, wherein the instructions are further configured to:

determine, at a second network element, the first path identifier based on an ingress port of the second network element configured to receive the first packet; and insert, by the second network element, the first path identifier into the first packet.

11. The media of claim 10, wherein the instructions are configured to insert the first path identifier into the first packet by adding a header to the first packet, the header comprising the first path identifier.

12. The media of claim 8, wherein the instructions are further configured to:

receive, at the first network element, a second packet after receiving the first packet, the second packet comprising a second Layer 3 source address, a second Layer 3 destination address, a second Layer 2 source hardware identifier, a second Layer 2 destination hardware identifier, and a third path identifier;

automatically determine a fourth path identifier based on a second port of the first network element associated with the second Layer 2 destination hardware identifier;

automatically cause the first packet to be delivered to a third node associated with the second Layer 2 destination hardware identifier in response to determining that the third path identifier and the fourth path identifier are the same.

13. The media of claim 8, wherein the first Layer 3 destination address is an Internet Protocol (IP) address and the second Layer 2 hardware identifier is a Media Access Control (MAC) address.

14. The media of claim 8, wherein the first path identifier is associated with a first service provider and the second path identifier is associated with a second service provider, the first service provider providing a first service using a first data center, the second service provider providing a second service using the first data center.

15. A system comprising:

a first network element configured to receive a first packet sent by a first node, the packet comprising a first Layer 3 source address, a first Layer 3 destination address, a first Layer 2 source hardware identifier, a first Layer 2 destination hardware identifier, and a first path identifier, the first path identifier situated between a Layer 2 header of the first packet and a Layer 3 header of the first packet;

wherein the first network element comprises a processor configured to:

in response to receiving the first packet, automatically determine a first port of the first network element associated with a second node, the second node associated with the first Layer 2 destination hardware identifier;

automatically determine a second path identifier based on the first port; and automatically prevent the first packet from being delivered to the second node associated with the first Layer 2 destination hardware identifier in response to determining that the first path identifier and the second path identifier are different.

16. The system of claim 15 further comprising:

a second network element comprising an ingress port configured to receive the first packet, the second network element configured to:

determine the first path identifier based on the ingress port; and insert, by the second network element, the first path identifier into the first packet.

17. The system of claim 16, wherein the second network element is configured to insert the first path identifier into the first packet by adding a header to the first packet, the header comprising the first path identifier.

18. The system of claim 15, wherein:

the first network element comprises a second port and is further configured to receive a second packet after receiving the first packet, the second packet comprising a second Layer 3 source address, a second Layer 3 destination address, a second Layer 2 source hardware identifier, a second Layer 2 destination hardware identifier, and a third path identifier; and the processor is further configured to:

automatically determine a fourth path identifier based on the second port being associated with the second Layer 2 destination hardware identifier;

automatically cause the first packet to be delivered to a third node associated with the second Layer 2 destination hardware identifier in response to determining that the third path identifier and the fourth path identifier are the same.

19. The system of claim 15, wherein the first Layer 3 destination address is an Internet Protocol (IP) address and the second Layer 2 hardware identifier is a Media Access Control (MAC) address.

20. The system of claim 15, wherein the first path identifier is associated with a first service provider and the second path identifier is associated with a second service provider, the first service provider providing a first service using a first data center, the second service provider providing a second service using the first data center.

* * * * *